United States Patent [19]

Graber et al.

[11] Patent Number: 5,038,063

[45] Date of Patent: Aug. 6, 1991

[54] ROTARY ACTUATOR WITH LIMITED ANGULAR MOVEMENT

[75] Inventors: David W. Graber, Millington; Andrzej M. Pawlak, Troy; Jeffery A. Zuraski; James W. Babineau, both of Saginan, all of Mich.

[73] Assignee: General Motors Corporation, Detroit, Mich.

[21] Appl. No.: 580,989

[22] Filed: Sep. 12, 1990

[51] Int. Cl.$^5$ .................. H02K 23/60; B62D 5/04
[52] U.S. Cl. ................................. 310/115; 180/79.1; 310/116
[58] Field of Search ............... 180/79.1, 142; 310/116, 310/156, 254, 257, 268, 115

[56] References Cited

U.S. PATENT DOCUMENTS

| | | | |
|---|---|---|---|
| 4,765,427 | 8/1988 | Yonker | 180/143 |
| 4,778,021 | 10/1988 | Morishita et al. | 180/79.1 |
| 4,871,040 | 10/1989 | Zuraski et al. | 180/79.1 |
| 4,886,138 | 12/1989 | Graber et al. | 180/142 |

FOREIGN PATENT DOCUMENTS 74145 11/1960 France .................. 310/156

Primary Examiner—Steven L. Stephan
Assistant Examiner—D. L. Rebsch
Attorney, Agent, or Firm—Mark A. Navarre

[57] ABSTRACT

A homopolar actuator has a permanent magnet disk element rotatably positioned between a pair of toothed pole pieces with mutually offset teeth, an electromagnetic coil and pole elements coupling the coil flux to the pole pieces. The pole pieces may themselves be rotatable or stationary. The permanent magnet circuit attempts to center the disk element relative to the pole pieces, and the electromagnetic circuit, depending on the direction of current in the coil, either reinforces the centering action or overcomes the centering force to displace the elements from center position. The device is used as a two or three position actuator or as an actuator or magnetic spring operating against an external force and seeking a position as a function of current.

13 Claims, 3 Drawing Sheets

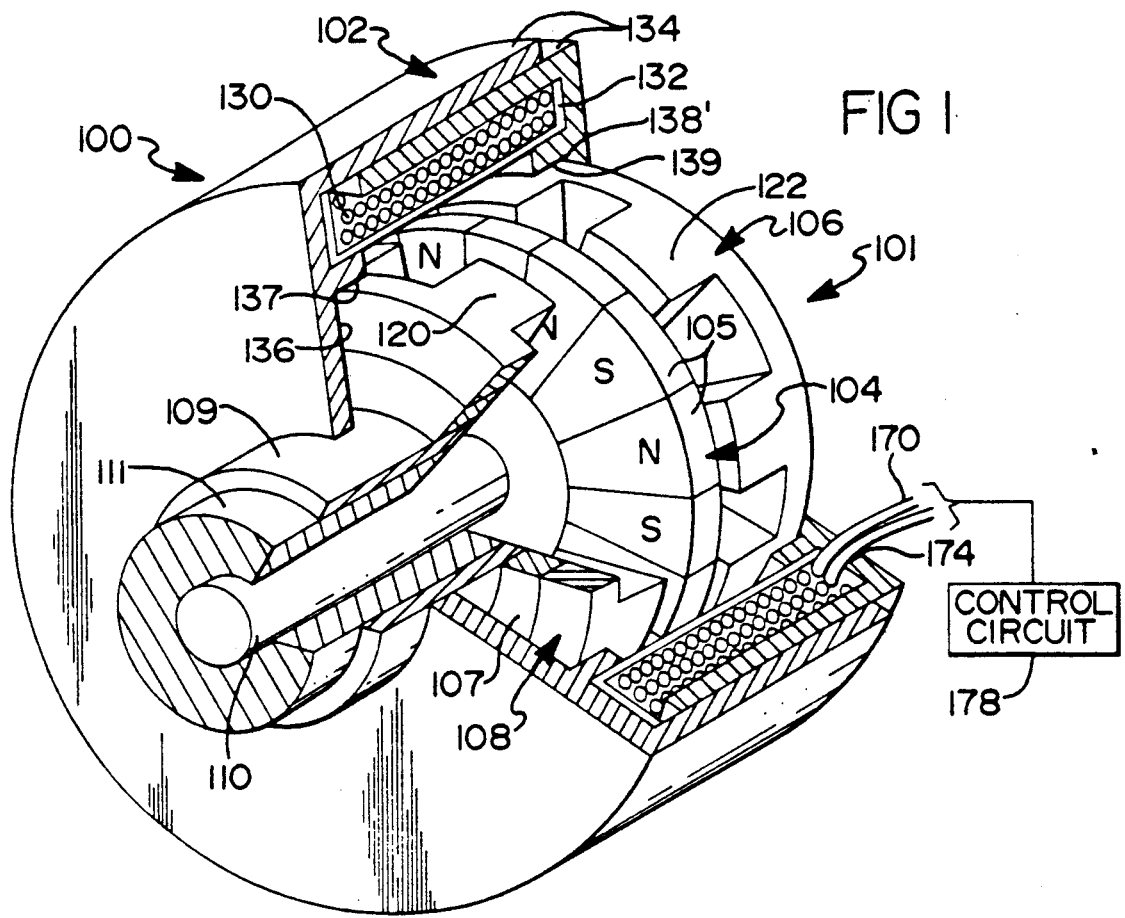
FIG 1
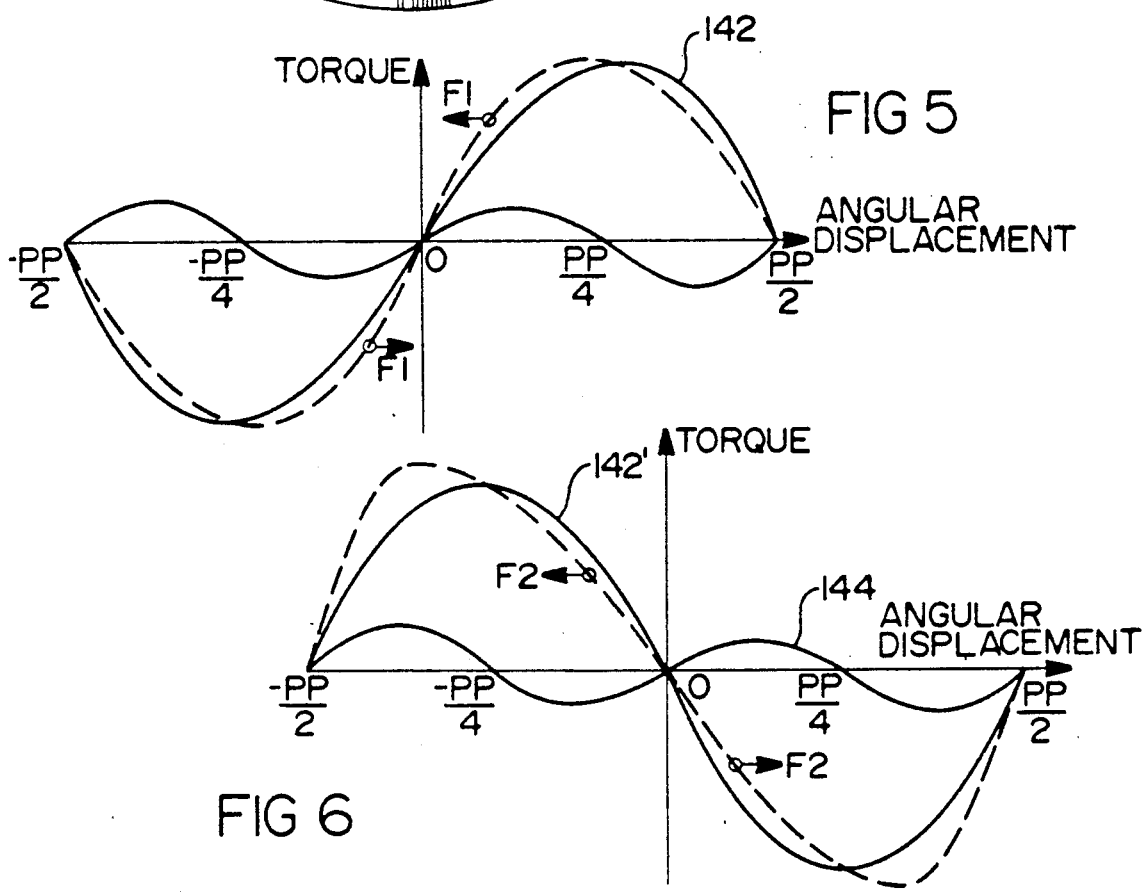
FIG 5
FIG 6

ROTARY ACTUATOR WITH LIMITED ANGULAR MOVEMENT

FIELD OF THE INVENTION

This invention relates to a rotary actuator or magnetic spring, and more particularly, to such an actuator or spring having a limited angular movement in response to an electrical energization.

BACKGROUND OF THE INVENTION

Torque motors working as magnetic springs can be used for applications requiring rotary motion to develop torque with limited angle of rotation. Magnetic springs accomplish this through attractive and repulsive electromagnetic torques of the rotor with respect to the stator. In some particular cases, an additional rotation of the stator is required. The additional degree of mechanical freedom should not affect the level of the electromagnetic torque developed in both directions of rotation for completed revolutions.

Our U.S. Pat. No. 4,871,040 issued Oct. 3, 1989, to Zuraski et al. entitled "Electromagnetic Control Apparatus for Varying the Driver Steering Effort of a Hydraulic Power Steering System", is an application of one version of an actuator utilizing the principles of this invention. In particular, it has two degrees of freedom for conjoint rotation of the rotor and stator, as well as magnetically variable torque developed between the rotor and stator as a function of relative displacement and energizing current. The mechanism is used in conjunction with a torsion bar to center two portions of a power steering valve. By varying the current to the electromagnetic coil, the net centering force on the valve is varied and the steering effort is therefore controlled.

The magnetic springs can be used, of course, with a one degree of freedom configuration where the stator is stationary and only the rotor moves. Further, since the direction of torque is dependent on the direction of energizing current, the actuator can be used effectively to develop centering torque or anti-centering torque in either direction from a center position, depending on the direction of the energizing current. This leads to application as a three position actuator having stable states when centered or when driven to stops on either side of center. The actuator can also be configured to seek an off-center position as a function of current where the actuator movement is restrained by an external spring force, such that for a given current, there is a specific position where the torque balances the spring force.

The electromagnetic mechanism of this invention includes a permanent magnetic circuit and an electromagnetic circuit. The permanent magnetic circuit comprises a pair of relatively rotatable elements, one of which is toothed to conduct magnetic flux, and one of which includes permanent magnets for establishing a permanent magnet coupling. The electromagnetic circuit comprises an energizing coil and an external magnetic circuit, and also shares the toothed element.

In one illustrated embodiment, the toothed element is defined by a pair of axially spaced magnetic pole pieces, and the permanent magnet element is a rotor defined by a disk element disposed between the magnetic pole pieces. The disk element is supported for rotation with an output shaft, and the pole pieces are supported for rotation with another shaft. The disk element is axially magnetized to define an even number N of radially extending, alternating magnetic polarity sectors. The pole pieces each have N/2 teeth extending toward the respective axial face of the disk element. The electromagnetic circuit comprises at least one annular exciting coil disposed about the rotary magnetic circuit and ferromagnetic pole elements positioned adjacent the magnetic pole pieces.

The above elements define two magnetic flux paths: a permanent magnet flux path which includes (neglecting leakage flux) only the rotary disk element and the pole pieces, and an electromagnetic flux path which includes the coil, pole elements, pole pieces and the disk element. The pole pieces and the disk element are oriented such that for a first polarity of energizing current (1) when the assembly is in the centered position, both flux paths are magnetically balanced, and (2) when there is relative angular displacement of the input and output shafts from center, the flux in the two paths develop in-phase centering forces which tend to restore the assembly to the centered position.

The force due to the electromagnetic flux path is variable over a wide range depending on the magnitude and direction of current supplied to the coil, such that for a second polarity of energizing current the permanent magnet centering force may be overcome and (1) when the assembly is in the centered position it is in a state of unstable equilibrium, and (2) when there is relative angular displacement of the input and output shafts from center, the overriding force due to the electromagnetic flux path tends to drive the assembly away from the centered position.

In another embodiment, the pole pieces are stationary instead of being fixed to a rotatable shaft, thus offering one degree of freedom instead of two. The principle of operation is the same in either case.

BRIEF DESCRIPTION OF THE DRAWINGS

The above and other advantages of the invention will become more apparent from the following description taken in conjunction with the accompanying drawings wherein like references refer to like parts.

FIG. 1 is a partly broken away isometric view of a rotary actuator according to the invention.

FIGS. 5 and 6 are torque-displacement curves for the actuator according to the invention for current flow in each direction.

DESCRIPTION OF THE INVENTION

Figure 2:
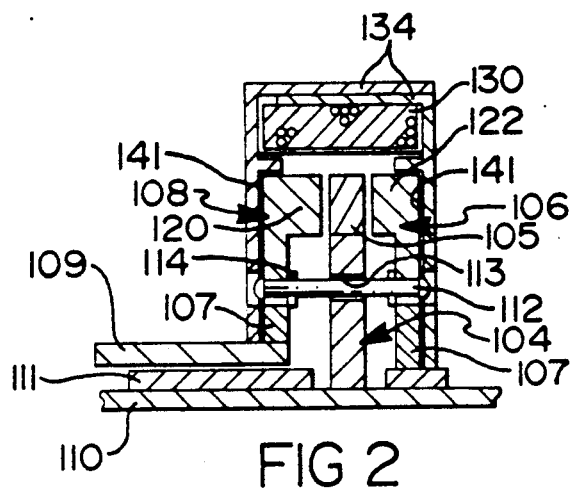
FIG. 2 is a cross-sectional view of the actuator of FIG. 1.

Referring to FIGS. 1 and 2, an electromagnetic actuator 100 comprises a rotary magnetic circuit and a stationary magnetic circuit, generally designated by the reference numerals 101 and 102, respectively.

The stationary electromagnetic circuit 102 comprises an annular exciting coil 130 wound around the rotary magnetic circuit 101 on a bobbin 132 and two partially encircling ferromagnetic pole elements 134. The pole elements 134 together define a structure having a U-shaped cross section surrounding the outer periphery and the sides of the coil 130 and extending radially inward along the rotary magnetic circuit 101 for coupling flux thereto. The pole surfaces 136-139 of pole elements 134 are positioned in close proximity to the rotary magnetic circuit 101 to facilitate both radial and axial transfer of magnetic flux between the stationary and rotary magnetic circuits 102, 101. Air gaps 141 are defined between the pole surfaces 136-139 and the rotary magnetic circuit 101, as best shown in FIG. 2. In the absence of any other housing, the pole elements comprise the stationary exterior portion of the actuator 100 and may thus be considered to be the support or housing for the remaining parts of the actuator. The lead ends 170 of coil 130 pass through a suitable opening 174 in the housing and are connected to a control unit 178 which supplies dc current to the coil 130.

The rotary magnetic circuit 101 comprises a permanent magnet disk element or rotor 104, and a pair of rotary ferromagnetic pole pieces 106, 108. The disk element 104 is secured to an output shaft 110. The pole pieces 106 and 108 are secured to a shaft 109 for rotation therewith via a nonmagnetic spacer 107. A journal or other bearing 111 affords rotational support between the shafts 109 and 110. A plurality of pins 112 secured into openings in the pole pieces 106, 108 serve to rigidly fasten the pole piece 108 to the pole piece 106, and to establish a predetermined angular alignment therebetween, as explained below. The pins 112 pass through elongated openings 113 in the disk 104 to allow limited angular movement of the disk 104 relative to the pole pieces 106, 108. The size of the elongated openings may be chosen to limit the range of relative movement, i.e., the ends of the openings 113 can serve as mechanical stops.

A pair of flanges 114 on each pin 112 seat against the pole pieces 106, 108 to establish a predetermined clearance which is somewhat greater than the axial dimension of the disk element 104. The disk element 104 is positioned approximately midway between the pole pieces 106, 108 at the time of assembly.

Figure 3:
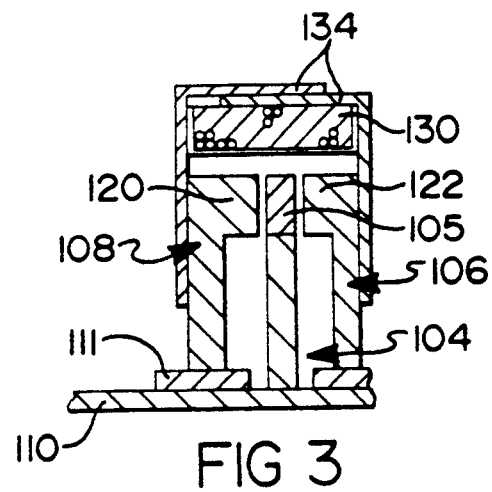
FIG. 3 is a cross-sectional view of another embodiment of the actuator according to the invention.

The FIG. 3 embodiment differs from that of FIGS. 1 and 2 in that the pole pieces 106, 108 are part of the stationary magnetic circuit, and thus the pole elements 134 directly contact the pole pieces to form a unitary housing, as well as an unbroken flux path, except for the gap between the pole pieces 106, 108 containing the permanent magnet disk element 104. The aligning pins 112 are not necessary to hold the pole pieces 106, 108 in the desired relative position.

The relationship of the two pole pieces 106, 108 and the permanent magnet disk element 104 is the same in either embodiment. As seen more clearly in the linearized representation of FIGS. 4a-4c, the permanent magnet disk element 104 is axially magnetized to define an even number N of radially extending, alternating magnetic polarity sectors 105, and the pole pieces 106, 108 each have N/2 homopolar teeth 120, 122 extending toward the axial faces of the disk element 104, the teeth being radially coextensive with the magnetic sectors 105. The teeth 120, 122 are angularly offset by approximately ¼ pole pitch (PP/4), and the disk element 104 is oriented such that its magnetic sectors are offset from like polarity teeth of the rotary pole pieces 106, 108 by ⅛ pole pitch (PP/8) when the disk element is centered at a neutral or home position relative to the pole pieces.

The number N of magnet sectors 105 is determined by the required relative displacement and establishes the pole pitch. As will be seen, the actuator movement is limited to PP/2 or PP/4 angular displacement. If N equals 20, for example, PP/4 angular displacement corresponds to 9 mechanical degrees.

Figure 4A:
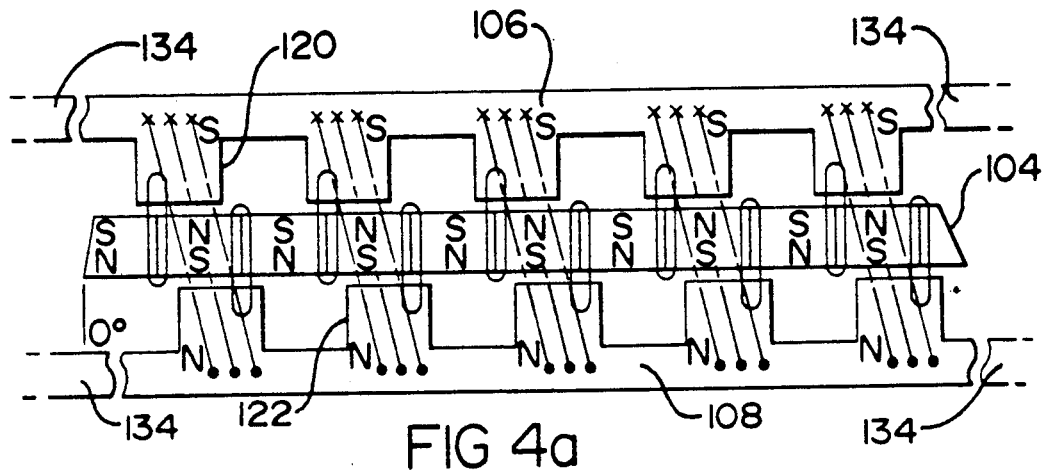
FIGS. 4a, 4b and 4c are schematic diagrams depicting linearized views of the magnetic circuit of the electromagnetic actuator of FIG. 1.
Figure 4B:
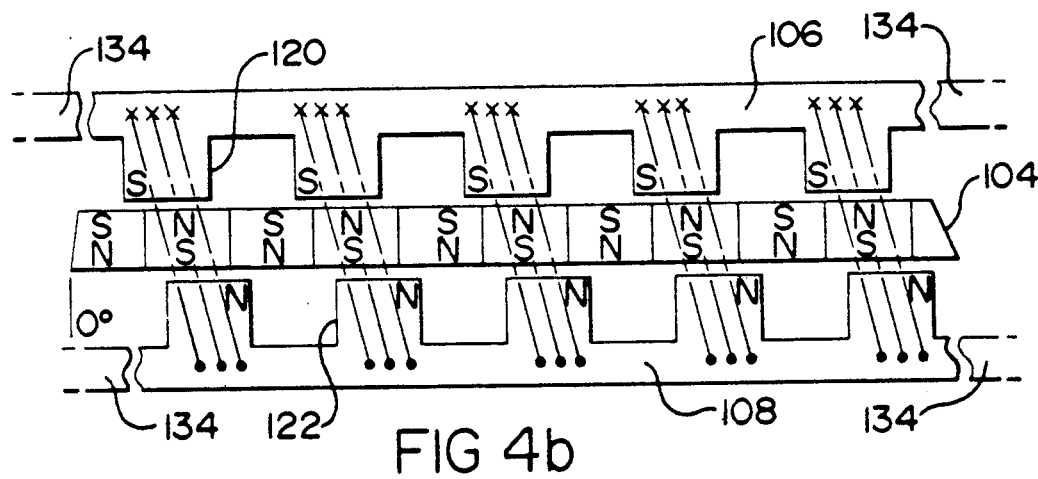
Figure 4C:
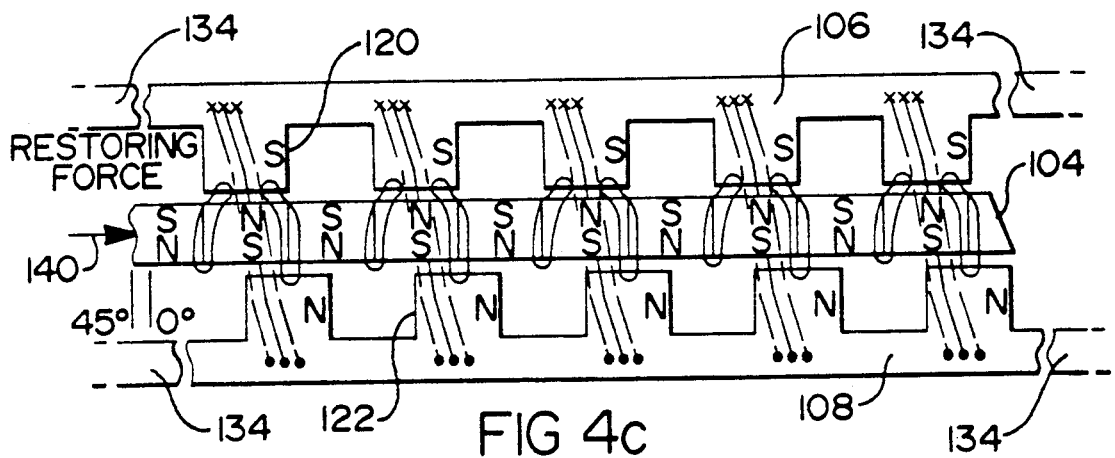

As shown in FIGS. 4a-4c, the above elements define two magnetic flux paths: a permanent magnet flux path which includes only the magnetic circuit elements 104, 106, 108, and an electromagnetic flux path which includes magnetic circuit elements 104, 106, 108 and 134.

Referring to FIGS. 4a and 4c, magnetic flux flowing in the permanent magnet flux path is produced solely by the permanent magnets of disk element 104. Such flux exists independently of the stationary pole element 134. When the elements are centered, as in FIG. 4a, no magnetic centering force (torque) is produced. When there is a relative displacement from the centered position, as in FIG. 4c, the magnetic forces generated by the flux in the permanent magnet flux path become imbalanced and develop a resultant restoring (centering) force in the direction of the arrow 140 without energization of the exciting coil 130 for displacements less than PP/4. Such force varies as a function of relative displacement, as graphically represented by the idealized trace 144 in FIG. 5. If the displacement exceeds PP/4 and is less than PP/2, the force changes direction and biases the elements away from the center position.

Referring to FIGS. 4b and 4c, and ignoring the effect of the permanent magnets, magnetic flux flowing in the electromagnetic flux path is produced primarily by energization of the stationary magnetic circuit exciting coil 130. As indicated by the broken lines, such flux enters the rotary pole piece 108 (NORTH) via the stationary pole elements 134 and exits the rotary pole piece 106 via the stationary pole elements. When the disk and the pole pieces are centered, as in FIG. 4b, no magnetic centering force is developed. When there is a relative displacement of the elements as in FIG. 4c, the magnetic forces generated by the flux in the electromagnetic flux path become imbalanced and develop a resultant restoring (centering) force in the direction of the arrow 140. Such force varies as a function of coil energization and relative displacement, the force for a given coil current magnitude being depicted as a function of relative displacement by the idealized traces 142 in FIG. 5.

The electromagnetic centering force represented by the trace 142 in FIG. 5 is produced by energizing the exciting coil 130 with a given current of a first polarity. Such force is additive to the permanent magnet centering force (trace 144), at least for relative displacements of +PP/4 or less. Where the electromagnetic force is much larger than the permanent magnet force, as shown in FIG. 5, the net force, as shown by the arrows F, is a centering force over an angular displacement of PP/2.

The electromagnetic force represented by the trace 142 in FIG. 6 is produced by energizing the exciting coil 130 with current of the same magnitude, but of a second polarity opposite to the FIG. 5 illustration. Such force is subtractive from the permanent magnet centering force, at least for relative displacements of PP/4 or less. Again, where the electromagnetic force is much larger than the permanent magnet force, the net force, as shown by the arrows F2, is away from center position for displacements less than PP/2. The net force is zero when the elements are centered and they are in a state of unstable equilibrium. Stable equilibrium occurs for a displacement from center of PP/2. If the elements are displaced from the center position when the opposite polarity current is applied, the resultant force will be in a direction to further increase the displacement.

The force or torque characteristics of the electromagnetic device leads to a number of possibilities of actuator configurations. One application is illustrated in the above U.S. Pat. No. 4,871,040 which makes use of the structure where both the pole pieces 106, 108 and the magnetic disk 104 rotate, and the magnetic forces are used to vary the steering input force of a vehicle power steering system. Other applications, using principally the FIG. 3 embodiment with stationary pole pieces 106, 108 and one output shaft 110 driven by the magnetic disk element 104, are shown schematically in FIGS. 7-10.

In FIGS. 7-10, the actuator 100 is shown in end view. The output shaft 110 carries a vane 150 to show the shaft displacement angle. An "x", labeled C, indicates center position. Stops 152, 154 are used to limit shaft rotation to the region of suitable characteristics. For convenience, current which forces the shaft toward a center position is called positive current and that which forces the shaft away from center position is called negative current.

Figure 7:
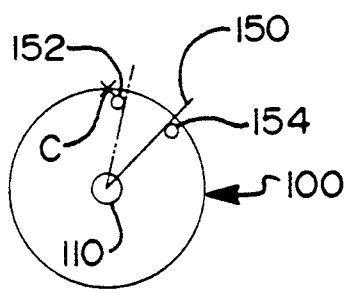
FIGS. 7-10 are schematic diagrams of various actuator configurations according to the invention.

FIG. 7 shows a two position actuator which operates with negative current to move the vane 150 to a stop 154 displaced far to the right of center C. When such current is terminated or positive current is applied, the vane is moved toward center C against a stop 152. The stop 152 is placed to the right of center to avoid any ambiguity in the actuating direction when the negative current is applied. The stop 154 is placed less than PP/4 to the right if the permanent magnet force alone is to be used for the return force. Where positive current is used for return force, the stop 154 is placed less than PP/2 to the right of center C. Such an actuator could be used, for example, as an automotive door lock actuator.

Figure 8:
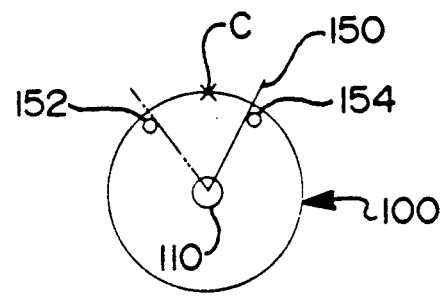

In FIG. 8, the actuator 100 has a stop 152 less than PP/4 to the left of center and a stop 154 less than PP/4 to the right of center. When no current is applied, the vane is biased to center position C, and when negative current is applied, the vane is moved to either stop 152, 154. An external bias may remove the ambiguity of bias direction when negative current is applied. If positive current is to be used for return force, the stops 152, 154 may be less than PP/2 from center.

Figure 9:
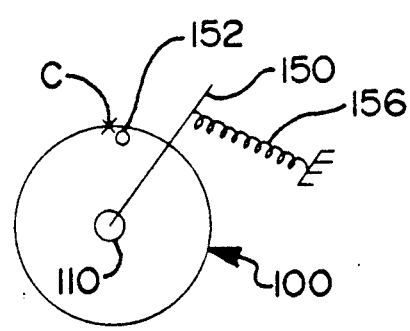
Figure 10:
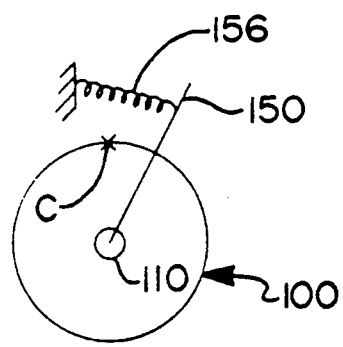
Figure 11:
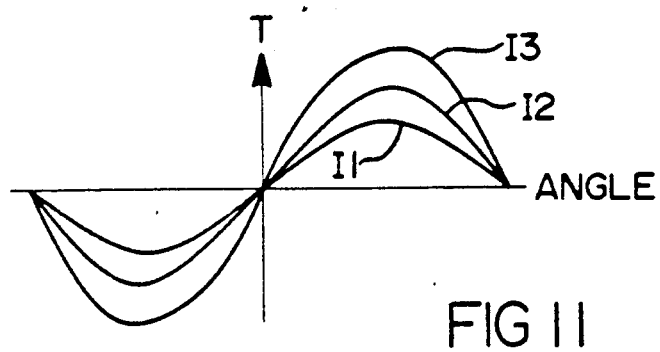
FIG. 11 is an actuator torque-displacement diagram for different energizing current magnitudes.

FIGS. 9 and 10 illustrate actuators which apply force sufficient to counter an external force as exemplified by a spring 156 under compression, and seek a position where the forces are balanced. The actuator torque (T) is a function of displacement, as shown in FIGS. 5 and 6, and is also a function of current, as shown in FIG. 11, where current I2 is greater than I1 and current I3 is greater than I2. Thus, the position can be varied as a function of current. In FIG. 9, a stop 152 is placed to the right of center, spring 156 biases the vane 150 toward center, and negative current is applied to move the vane to the right against the spring. The vane will seek a position where the actuator force balances the spring force. FIG. 10 uses positive current to force the vane toward center against the force of spring 156. The position of balanced forces is controlled by the current applied to the actuator. Either of the FIGS. 9 and 10 actuators may be used in an automotive vehicle, for example, to position a throttle valve as a function of current for engine control purposes.

It will thus be apparent, in view of the above explanation, that the actuator as a torque motor or magnetic spring is useful as a current controlled device to accomplish a controlled angularly limited displacement of an output shaft relative to either a stationary reference or a rotatable reference. The actuator thus controlled can, as a matter of design, be made to perform as a two or three position actuator or as a current magnitude controlled positioner operating against a linear spring.

The embodiments of the invention in which an exclusive property or privilege is claimed are defined as follows:

1. A rotary actuator having a limited angular motion comprising:

an output shaft for rotation about an axis, a permanent magnet rotor mounted on the output shaft for rotation therewith, the rotor having a plurality of magnetic poles, a stationary electromagnetic coil surrounding the rotor, a magnetic circuit coupled to the coil and including a pair of spaced toothed pole pieces coaxial with the rotor, means for limiting rotary displacement of the output shaft relative to the pole pieces, each toothed pole piece having a number of teeth equal to half the number of poles on the rotor, the teeth extending toward the magnetic poles of the rotor and being angularly offset from the teeth of the other pole piece by a fixed amount, whereby in the absence of energizing current the rotor is biased toward a stable position with respect to the pole pieces, and a current in the coil causes rotor torque in an amount and direction dependent on the direction and magnitude of the current and on the relative position of the rotor and the pole pieces.

2. A rotary actuator having a limited angular motion comprising:

an output shaft for rotation about an axis, a magnetic disk mounted on the output shaft for rotation therewith, the disk having a plurality of poles magnetized in the axial direction, a stationary electromagnetic coil surrounding the output shaft, a magnetic circuit coupled to the coil and including a pair of spaced toothed disks aligned with and on either side of the magnetic disk, each toothed disk having a number of teeth equal to half the number of poles on the magnetic disk, the teeth extending toward the magnetic disk and being offset from the teeth of the other disk by a fraction of the pole pitch, whereby in the absence of energizing current in the coil, the magnetic disk is torqued toward a center position with respect to the toothed disks, a current in one direction reinforces the torque toward the center position, and current in the other direction torques the magnetic disk in a direction away from the center position to thereby control the output shaft.

3. The invention as defined in claim 2 wherein the toothed disks are stationary.

4. The invention as defined in claim 2 wherein the toothed disks are mounted for rotation together about the axis so that rotation of the toothed disks is imposed on the magnetic disk and output shaft in addition to the control effect of the energizing current.

5. A rotary actuator having a limited angular motion comprising:

a support, an output shaft mounted in the support for rotation about an axis, a magnetic disk mounted on the output shaft for rotation therewith, the disk having a plurality of poles magnetized in the axial direction, an electromagnetic coil mounted on the support, a magnetic circuit coupled to the coil and including a pair of toothed disks mounted to the support on either side of the magnetic disk, each toothed disk having a number of teeth equal to half the number of poles on the magnetic disk and adjacent the poles, the teeth extending toward the magnetic disk and being offset by one fourth of the pole pitch, and means for restraining the relative displacement of the magnetic disk relative to the toothed disks, whereby in the absence of energizing current in the coil, the magnetic disk is torqued toward a center position with respect to the toothed disks, a current in one direction reinforces the torque toward the center position, and current in the other direction torques the magnetic disk in a direction away from the center position to thereby control the output shaft.

6. The invention as defined in claim 5 wherein the restraining means comprises stop means to limit the rotation angle of the output shaft.

7. The invention as defined in claim 5 wherein the restraining means comprises resilient means coupled to the output shaft to produce a counter torque on the output shaft as a function of shaft angular position, whereby the position of the output shaft depends on the counter torque as well as the direction and magnitude of the energizing current.

8. The invention as defined in claim 5 wherein the restraining means includes stops at either side of the center position to limit shaft movement to an angular displacement in either direction from the center position, whereby the actuator has three stable positions.

9. A rotary actuator having a limited angular motion comprising:

first and second coaxial relatively rotatable means, the first means including a permanent magnet disk magnetized axially with N poles, the second means including a pair of toothed pole pieces adjacent opposite sides of the magnet disk, each disk having N/2 teeth extending toward the poles of the magnet disk so that the disk and pole pieces form a permanent magnet circuit, the teeth of the respective pole pieces being angularly offset by a fraction of the pole pitch, so that magnetic flux developed by the magnet disk enters the pole pieces to develop a permanent magnet centering force which is balanced when the magnet disk and the pole pieces are at a center position, and an electromagnetic circuit including an energizing coil and the pole pieces for passing flux developed by the coil through the magnet disk for developing an additional centering force on the magnet disk when the current is in one direction and a force opposing the centering force when the energizing current is the other direction.

10. The invention as defined in claim 9 wherein the force due to energizing current in the said other direction is sufficient to overcome the permanent magnet centering force to relatively move the first and second means to a stable position angularly spaced from the center position.

11. The invention as defined in claim 9 including spring means for biasing the first means relative to the second means in a direction counter to the force developed by the electromagnetic circuit wherein the net force developed by the permanent magnet circuit and the electromagnet circuit is a function of displacement from center position and of the current magnitude so that the first and second means assume a relative position where the said net force is in equilibrium with the spring means force.

12. A magnetic spring having variable torque dependent on angular displacement and applied electrical current comprising:

an output shaft for rotation about an axis, a permanent magnet rotor mounted on the output shaft for rotation therewith, the rotor having a plurality of magnetic poles, a stationary electromagnetic coil surrounding the rotor, a magnetic circuit coupled to the coil and including a pair of spaced toothed pole pieces coaxial with the rotor, each toothed pole piece having a number of teeth equal to half the number of poles on the rotor, the teeth extending toward the magnetic poles of the rotor and being angularly offset from the teeth of the other pole piece by a fixed amount, whereby in the absence of energizing current the rotor is biased toward a stable position with respect to the pole pieces, and a current in the coil causes rotor torque in an amount and direction dependent on the direction and magnitude of the current and on the relative position of the rotor and the pole pieces.

13. The invention as defined in claim 12 including mechanical spring means for biasing the rotor in opposition to the torque caused by the current whereby the rotor equilibrium position is a function of the current applied to the electromagnetic coil.

* * * * *